United States Patent [19]
Levy et al.

[11] Patent Number: 4,810,598
[45] Date of Patent: Mar. 7, 1989

[54] GAS RECOMBINATION ASSEMBLY FOR ELECTROCHEMICAL CELLS

[75] Inventors: Isaac Levy, New Fairfield; Allen Charkey, Brookfield, both of Conn.

[73] Assignee: Energy Research Corporation, Danbury, Conn.

[21] Appl. No.: 172,632

[22] Filed: Mar. 24, 1988

[51] Int. Cl.⁴ ............................................. H01M 10/52
[52] U.S. Cl. ..................................... 429/59; 429/57; 429/122
[58] Field of Search ...................... 429/57, 7, 59, 122, 429/86

[56] References Cited

U.S. PATENT DOCUMENTS

| | | | |
|---|---|---|---|
| 2,104,973 | 1/1938 | Dassler | 429/59 |
| 3,102,059 | 8/1963 | Harmer | 136/181 |
| 3,287,174 | 11/1966 | Hennigan et al. | 136/179 |
| 3,622,398 | 11/1971 | Sekido et al. | 136/179 |
| 3,630,778 | 12/1971 | Kreidl et al. | 136/6 |
| 3,701,691 | 10/1972 | Sassannshausen et al. | 429/86 |
| 3,817,717 | 6/1974 | Kreidl et al. | 429/57 |
| 3,893,870 | 7/1975 | Kozawa | 136/107 |
| 3,930,890 | 1/1976 | Dietz | 136/181 |
| 3,976,502 | 8/1976 | Sekido et al. | 429/59 |
| 4,078,893 | 3/1978 | Gilman et al. | 23/253 |
| 4,374,907 | 2/1983 | Chuang et al. | 429/57 |
| 4,447,508 | 5/1984 | Jensen | 429/57 |
| 4,584,249 | 4/1986 | Smithrick | 429/57 |

FOREIGN PATENT DOCUMENTS

| | | | |
|---|---|---|---|
| 2340945 | 8/1973 | Fed. Rep. of Germany | 429/57 |
| 0116278 | 9/1981 | Japan | 429/86 |

Primary Examiner—Donald L. Walton
Attorney, Agent, or Firm—Robin, Blecker & Daley

[57] ABSTRACT

An assembly for recombining gases generated in electrochemical cells wherein a catalyst strip is enveloped within a hydrophobic, gas-porous film which, in turn, is encased between gas-porous, metallic layers. The sandwich construction of metallic layers and film is formed into a spiral with a tab for connection to the cell.

21 Claims, 2 Drawing Sheets

GAS RECOMBINATION ASSEMBLY FOR ELECTROCHEMICAL CELLS

The Government has rights in this invention pursuant to Contract No. DE-AC-08-85-NV 10442 awarded by the U.S. Department of Energy.

BACKGROUND OF THE INVENTION

This invention relates to assemblies for use with electrochemical cells and, in particular, to assemblies for recombining gases produced in such cells.

It is well known that electrochemical cells and, in particular, alkaline batteries such as nickel cadmium batteries, experience a loss in the water content of the cell electrolyte during operation. This loss in water results from electrolysis which causes conversion of the water into hydrogen and oxygen during overcharge. As a result, the level of electrolyte in the cell decreases correspondingly and if this allowed to continue cell failure will occur.

One technique for inhibiting water loss in electrochemical cells involves adapting the cells in such a way that the evolved oxygen and hydrogen are recombined to regenerate the lost water which is then returned to the cell electrolyte. This technique utilizes a catalyst, such as platinum, for catalyzing the recombination reaction. However, difficulties have been encountered in controlling the catalyzed reaction due to its highly exothermic nature. Failure to control the reaction can lead to destruction of the catalyst in smaller cells and even more severe conditions, such as cell failure, in larger cells.

It is, therefore, a primary object of the present invention to provide an improved assembly for recombining gases produced in an electrochemical cell.

It is a further object of the present invention to provide an catalyst assembly for recombining hydrogen and oxygen gases produced in an electrochemical cell so as to control the heat generated while preserving the efficiency and compactness of the cell.

SUMMARY OF THE INVENTION

In accordance with the principles of the present invention, the above and other objectives are realized in an assembly comprising a catalyst strip which is enveloped within a gas-porous, hydrophobic film. The latter film, in turn, is encased between two metallic, gas-porous layers to form a sandwich construction which is configured into a spiral.

In the embodiment of the assembly to be disclosed hereinafter, a metallic tab is affixed to the end of the spiral and the assembly is affixed in the interior of the cell by connecting the tab to an interior section of one of the cell terminals. Straps attached to the cell electrodes also connect to this terminal section and a common connection is used for the straps and the assembly tab.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
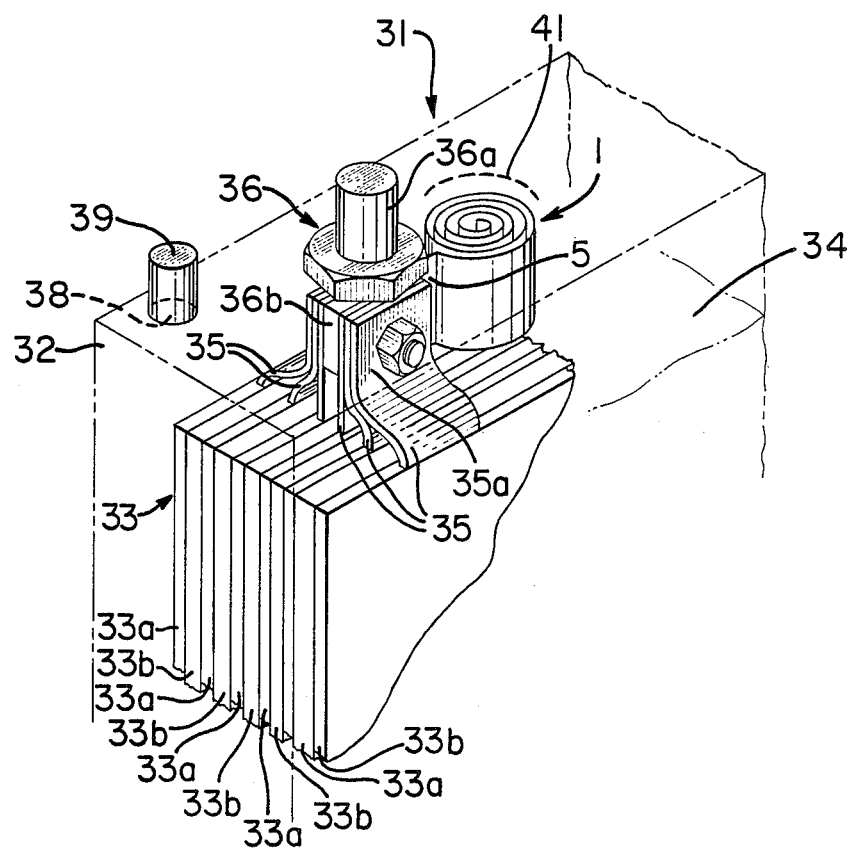
FIG. 1 shows an assembly in accordance with the principles of the present invention incorporated into an electrochemical cell.

In FIG. 1, an assembly 1 in accordance with the invention is shown. The assembly 1 is incorporated into an electrochemical cell 31, assumed to be a Ni-Cd battery, in order to recombine the hydrogen and oxygen gases generated in the cell during overcharge. These gases are recombined by the assembly 1 to produce water which is returned to the electrolyte of the cell.

Figure 3:
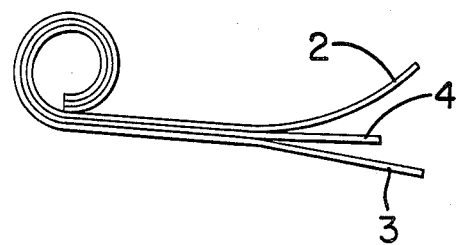
FIG. 3 shows the assembly of FIG. 1 in greater detail.
Figure 4:
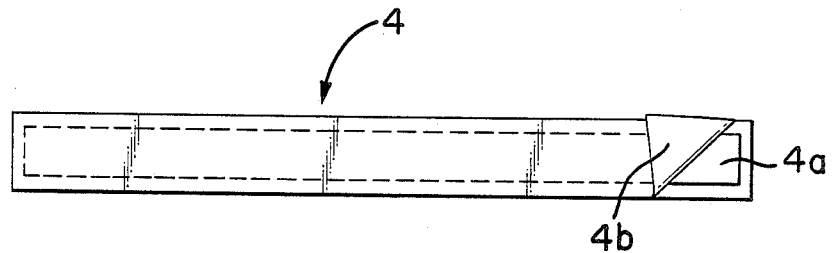
FIG. 4 shows the enveloped catalyst strip of the assembly of FIG. 1 in greater detail.

In accordance with the invention and as shown in detail in FIGS. 3 and 4, the assembly 1 is a sandwich construction of two outer metallic, gas-porous layers 2 and 3 and an inner layer 4 which comprises a catalyst strip 4a enveloped within a hydrophobic, gas-porous film 4b. The sandwich is rolled, as in FIG. 3, to obtain a spiral configuration.

Figure 2:
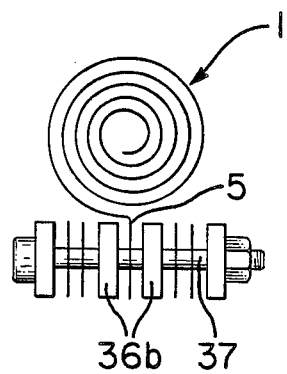
FIG. 2 shows schematically the manner of connection of the assembly in the electrochemical cell of FIG. 1.

The metallic layers 2 and 3 are made wider than the layer 4 and greater in length. The extended length of the layers provides a tab 5 (see, FIGS. 1 and 2) at the end of the spiral which facilitates mounting of the assembly 1 in the cell 31. The extended width portions of the layers, in turn, provide cooling fins for the assembly 4, as will be described more fully below.

As shown in FIG. 1, the cell 31 comprises a casing 32 in which is housed an electrode structure 33 and an electrolyte 34. The electrode structure 33 comprises positive electrodes 33a between which are interleaved separator and negative electrode units 33b.

Ends 35a of straps 35 connect the positive plates 33a to the lower section 36b of the positive terminal 36 of the cell. The terminal section 36b lies within the casing 32, while the upper section 36a of the terminal 36 extends out of the casing for connection to equipment to be supplied energy by the cell. A bolt 37 passes through the lower section 36b of the terminal 36 and through the straps ends 35a to effect connection of the straps and, therefore, the positive electrodes 33a, to the terminal.

In accord with the invention, the assembly 1 is mounted in the cell 31 by also connecting the assembly to the lower section 36b of the terminal 36. This is accomplished via the above mentioned tab 5 of the assembly which is similarly bolted to the lower section 36b by the bolt 37.

With the assembly 1 constructed as above-described, recombination of the hydrogen and oxygen generated in the cell 31 occurs in a controlled manner and without significantly disturbing the efficiency of the cell. In particular, the generated oxygen and hydrogen pass into the assembly 1 and through the gas-porous, metallic layers 2 and 3 and the gas-porous film 4b to the catalyst strip 4a. At the strip 4a, the gases undergo a catalyzed recombination to produce water vapor which now passes out of the film 4b and layers 2 and 3 to be condensed at the terminal section 36b. The condensed water then passes back into the electrolyte 34 to replenish the water being lost in the cell by electrolysis.

The coiled or spiral configuration of the assembly 1 is highly beneficial in allowing for a large surface area for the catalyzed recombination reaction in a small space. Further, the above-mentioned cooling fins provided by the extended widths of the two metallic layers 2 and 3 aid in controlling the heat transfer from the assembly. Additional control is achieved as a result of connection of the assembly 1 to the positive terminal 36 of the cell. This terminal now acts as a heat sink to facilitate cooling of the assembly, while at the same time places the assembly in a position where the cell gases are being formed so as to promote the recombination process. The controlled heat transfer of the assembly 1 reduces the tendency of water vapor to condense inside the film 4b and quickens the revaporization of any water that does condense.

In the present illustrative form of the invention, the catalyst strip 4a comprises a mixture of polytetrafluoroethylene (PTFE) and platinum-on-carbon. Use of PTFE as a binder for the strip adds hydrophobicity to the strip as well as flexibility. The flim 4b is also comprised of PTFE.

In a particular example of fabrication of an assembly 1 for use in a Ni-Cd battery, the roll bonded electrode method of U.S. Pat. No. 3,898,099, assigned to the same assignee hereof, is used to form the catalyst strip 4a as a self supporting member. More particularly, a wet mixture of PTFE and platinum-on-carbon is first calendered and dried into a 0.016" thick flexible sheet. A platinum loading of 5.5% of total catalyst weight is used and provides a loading of 0.5–0.6 mg. Pt/cm$^2$.

A 0.5"×15" strip of catalyst is cut from the sheet. The strip is wrapped and sealed in an evelope of 0.005" thick unsintered PTFE film. The PTFE film is then encased between two 0.003" thick nickel foil layers. The inner layer is ¾" wide by 17" long and the outer layer is ¾" wide by 19" long. The resultant sandwich is rolled into a tight spiral or spool of ¾" OD×¾" high×¼" ID. A tab of ¾" height×1" length is formed at the end of the spiral by joining the nickel foil portions which extend beyond the PTFE envelope. The assembly is incorporated into a 100 Ah Ni-Cd battery by inserting the tab between the positive electrode straps and bolting to the positive terminal. Operation of the cell demonstrates an initial efficiency of about 45% and after stabilization an efficiency of about 85%.

In order to further enhance the gas recombination properties of the assembly 1, the cell 31 can be slightly pressurized to increase the residence time in the cell of the generated hydrogen and oxygen gases. This can be accomplished by use of a valve 39 in the vent hole 38 of the cell. A typical level of pressurization might be about 3 psi which can be achieved utilizing a spring-operated plastic valve operative at the 3 psi pressure level.

A further modification particularly useful in hot climates or in cells having low ventillation, is to provide a canopy 41 made, for example, of nickel above the assembly 1. This will promote condensation of the water vapor outgoing from the cell.

In all cases it is understood that the above-identified arrangements are merely illustrative of the many possible specific embodiments which represent applications of the present invention. Numerous and varied other arrangements can readily be devised in accordance with the principles of the invention without departing from the spirit and scope of the invention.

What is claimed is:

1. An assembly for use in promoting catalytic recombination of gases in an electrochemical cell comprising:
a catalyst strip;
a hydrophobic, gas porous film enveloping said catalyst strip;
first and second gas-porous, metallic layers together encasing said film to form a sandwich;
said sandwich being formed into a spiral.

2. An assembly in accordance with claim 1 wherein:
a metallic tab is affixed to the outer end of said spiral.

3. An assembly in accordance with claim 2 wherein:
the end of at least one of said first and second metallic layers extends beyond the end of said film and forms said tab.

4. An assembly in accordance with claim 3 wherein:
the ends of both said first and second metallic layers extend beyond the end of said film and form said tab.

5. An assembly in accordance with claim 2 wherein:
said metallic layers and said tab comprise nickel.

6. An assembly in accordance with claim 5 wherein:
said hydrophobic, gas porous film comprises PTFE.

7. An assembly in accordance with claim 6 wherein:
said PTFE is unsintered.

8. An assembly in accordance with claim 6 wherein:
said catalyst comprises a mixture of platinum and PTFE.

9. An assembly in accordance with claim 1 wherein:
the width of at least one of said metallic layers is greater than the width of said film, thereby forming a fin for cooling said assembly.

10. An assembly in accordance with claim 1 wherein:
said hydrophoboic, gas porous film comprises PTFE.

11. An assembly in accordance with claim 10 wherein:
said PTFE is unsintered.

12. An assembly in accordance with claim 1 wherein:
said catalyst comprises a mixture of platinum and PTFE.

13. A electrochemical cell for use with an electrolyte comprising:
a casing;
electrode structure housed within the casing;
and an assembly mounted within the casing for promoting the recombination of gases in the cell, the assembly comprising: a catalyst strip; a hydrophobic, gas-porous film enveloping the catalyst strip; first and second gas-porous, metallic layers together encasing the film to form a sandwich; and said sandwich being formed into a spiral.

14. A cell in accordance with claim 13 wherein:
said assembly further includes a metallic tab affixed to the outer end of said spiral;
and said assembly is mounted in said cell via the tab.

15. A cell in accordance with claim 13 wherein:
said cell further includes a terminal mounted to said casing and having a first section extending into the interior of said casing;
and said assembly is mounted to said first section of said terminal.

16. A cell in accordance with claim 15 wherein:
said terminal is the positive terminal of said cell.

17. A cell in accordance with claim 15 wherein:
said electrode structure includes: a plurality of electrodes; and straps each attached to an electrode;
said assembly further includes a metallic tab affixed to the outer end of said spiral;
and said cell further includes means for attaching said straps and said tab to said first section of said terminal.

18. A cell in accordance with claim 17 wherein:
said means is a bolt which extends through said section, straps and tab.

19. A cell in accordance with claim 15;
said assembly further includes a metallic tab affixed to the outer end of said spiral, said tab being attached to said first section of said terminal.

20. A cell in accordance with claim 19 wherein: said tab is formed by at least an end of one of said first and second metallic layers.

21. A cell in accordance with claim 13 wherein: said cell is a Ni-Cd battery.

* * * * *